Patented Oct. 5, 1948

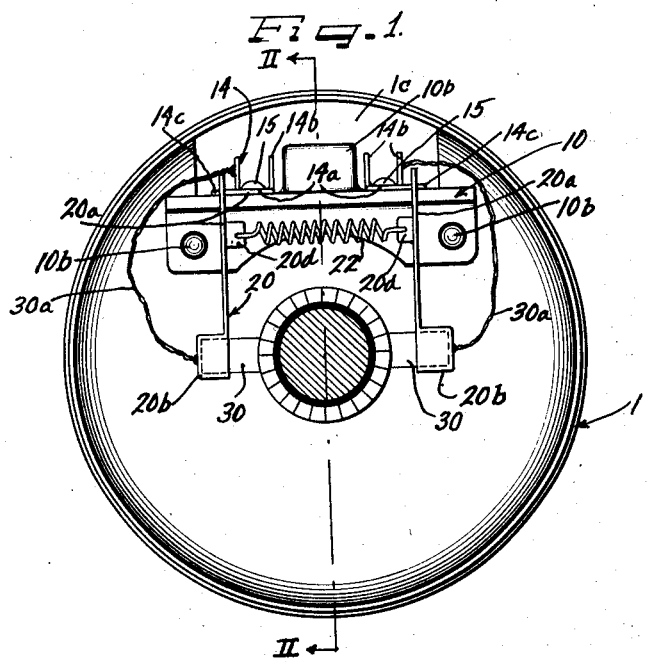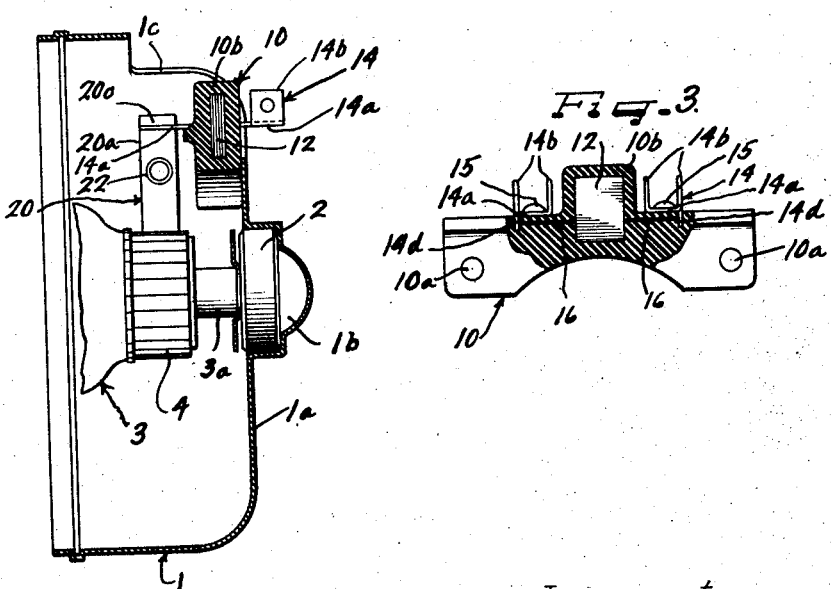

2,450,809

UNITED STATES PATENT OFFICE 2,450,809

CONDENSER AND BRUSH MOUNTING FOR DYNAMOELECTRIC MACHINES

Joseph Nader, Glen Ellyn, Ill., assignor to Nader Engineering Company, Chicago, Ill., a corporation of Illinois Application June 2, 1947, Serial No. 751,910

10 Claims. (Cl. 171—324)

This invention relates to dynamoelectric machines and particularly to an improved brush and condenser support arrangement for a commutator type dynamoelectric machine of the fractional horsepower class.

In many applications of commutator type dynamoelectric machines, and particularly those utilized in household appliances, it has become customary to connect a condenser directly across the brushes of the machine to short circuit high frequency voltages generated in the normal commutation process so as to eliminate the undesirable static effects of such high frequency voltages upon radios in the immediate vicinity of the dynamo electric machine. In fact, the utilization of such condensers has become so widespread that many fractional horsepower motors are now manufactured with the condenser included in the motor structure.

Obviously, the mounting of the condenser unit within or on the dynamoelectric machine represents an additional expense item and, furthermore, the soldered connections required in conventional condenser installations are often difficult to make within the confines of the frame of the dynamoelectric machine. Furthermore, it is desirable that the brush supports employed in a dynamoelectric machine be constructed so as to be susceptible of manufacture by low cost, high quantity production methods, such as stamping, and at the same time, that such brush supports be capable of assembly within the dynamoelectric machine with a minimum expenditure of time and effort.

Accordingly, it is an object of this invention to provide an improved condenser and brush mounting structure for dynamoelectric machines.

A particular object of this invention is to provide a unique condenser mounting construction for a dynamoelectric machine characterized by the integral molding of the condenser within an insulating block which may be secured to a stationary element of the dynamoelectric machine and utilized for other purposes such, for example, as supporting the brushes of the machine.

A further object of this invention is to provide a combined condenser and brush mounting for a commutator type dynamoelectric machine wherein a single block of insulating material has a condenser integrally molded therein as well as a pair of terminal members supported thereon and electrical connections made between the condenser and such terminal members. Such terminal members are also capable of being utilized as supporting hangers for a pair of brush supports.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is an end elevational view of a dynamoelectric machine embodying this invention looking into the machine along the axis thereof and with field parts omitted for clarity;

Figure 2 is a partial sectional view of the machine shown in Figure 1 taken along the plane II—II thereof; and Figure 3 is an elevational view, partly in section, of the insulating block employed for mounting the condenser and brushes of the dynamoelectric machine As shown on the drawings:

To illustrate the application of this invention to a dynamoelectric machine, there is shown in the drawings a popular construction for a commutator type, fractional horsepower dynamoelectric machine comprising a stamped end frame member 1 of generally cup-shaped configuration having an end wall 1a and a bearing recess 1b integrally formed in such end wall to snugly receive an anti-friction bearing 2. Frame member 1 is also provided with an aperture 1c for a purpose to be described. The armature 3 has a shaft portion 3a journaled in bearing 2 and a conventional commutator 4 mounted thereon.

In accordance with this invention, a block 10 of electrically insulating material is provided which is of generally rectangular configuration and is provided with a plurality of apertures 10a to permit such block to be securely fastened to the end wall 1a of the motor end frame as by rivets 10b. It will, of course, be understood that insulating block 10 may be equally as well mounted to any stationary element of the dynamoelectric machine construction that is convenient. Preferably, the block 10 is mounted so as to be axially adjacent both the commutator 4 and aperture 1c and overlying the commutator.

The block 10 is provided with an enlarged central portion 10b within which a suitable condenser 12 is integrally molded. The condenser 12 is of course selected of proper capacity to function as a spark reducer and static eliminator for the particular dynamoelectric machine. On each side of the condenser 12 a metallic terminal member 14 is rigidly secured to insulating block 10 either by rivets 15 or by integrally molding such members therein. Electrical conductors 16 are provided connecting opposite sides of condenser 12 to the terminal members 14. Such conductors are preferably integrally molded within the insulating block 10. Hence the entire sub-assembly of the insulating block 10, the condenser 12, the terminal members 14 and the electrical conductor 16 may be achieved exteriorly and independently of the frame of the dynamoelectric machine and hence such sub-assembly may be rapidly and economically produced.

The terminal members 14 are of generally U-shape configuration having an elongated base portion 14a and upstanding arm portion 14b of limited length. When assembled, the arm portions 14b preferably project through aperture 1c and are utilized to secure necessary motor connections thereto by soldering. The base portion 14a of each terminal member projects inwardly beyond the extremities of the insulating block 10 in generally overlying relationship with respect to the commutator 4 and defines a brush support lip 14c. Lastly, each terminal member 14 is provided with an integral depending leg portion 14d which projects into the insulating block 10 to be electrically secured to condenser 12 by the conductors 16 (Figure 3).

The projecting lip portions 14c of each of the terminal members 14 are suitably shaped so as to define mounting lugs respectively disposed on opposite sides of the commutator 4. A pair of brush holders 20 are provided, which are of generally dipper-like configuration having elongated handle portions 20a and brush supporting cup portions 20b. The end of each handle portion 20a is apertured as indicated at 20c (Figure 2) to receive the lugs 14c of the terminal members 14 so as to swivelly support the brush support members 20 in depending relationship with respect to the insulating block 10. The brush support members 20 are thus disposed on opposite sides of the commutator 4 and, when suitable pig tailed brushes 30 are inserted in the cup-shaped portions 20b thereof, such brushes will be in position to cooperate with the commutator 4.

To insure the engagement of the brushes 30 with commutator 4, a spring 22 is insulatingly connected between the brush supports 20 as by having the ends thereof hooked into apertured, integral ears 20d formed on the brush supports. With such an arrangement, the spring 30 is formed of any one of several well known plastic materials which will provide both electrically insulating and resilient properties.

The pig tails 30a of the brushes 30 are connected directly by a solder joint to any suitable part of the terminal members 14. If connected to the projecting portions of the terminal members such soldering may be readily performed concurrently with the other connections after assembly of the machine. Hence the electrical connections of the brushes 30 to the terminal strips 14 are independent of the relatively limited frictional contact provided by the swivel mounting of the brush supports 20 on the mounting lugs 14c.

From the foregoing description, it is apparent that this invention provides a combined condenser and brush mounting arrangement which substantially reduces the cost of manufacture and assembly of a dynamoelectric machine. The integral molding of the condenser 12 in insulating block 10 insures that the leads 16 connecting the condenser across the brushes will be as short as possible and hence the effectiveness of the condenser is substantially increased by virtue of elimination of the additional resistance and inductance which is inherent in the longer condenser connecting leads required in constructions heretofore known. Furthermore, constructions embodying this invention completely eliminates necessity of making soldered connections within the frame or casing of the dynamoelectric machine. The location of the upstanding terminal arms 14b of the terminal members 14 in a position exteriorly of the frame 1 insures that the necessary soldered connections thereto may be quickly and economically accomplished.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. In a dynamoelectric machine having a frame and a commutator, a block of electrically insulating material adapted to be secured to the frame adjacent the commutator, spaced conducting means on said block for supporting a pair of brushes in cooperative relation with said commutator, a condenser integrally molded in said insulating block, and means for electrically connecting said condenser directly across said conducting means.

2. In a dynamoelectric machine having a frame and a commutator, a block of electrically insulating material adapted to be secured to the frame adjacent the commutator, spaced means on said block for supporting a pair of brushes in cooperative relation with said commutator, a condenser integrally molded in said insulating block, and a pair of conductors disposed in said insulating block and electrically connecting said condenser across said spaced means.

3. In a dynamoelectric machine having a stationary element and a rotating commutator, a block of electrically insulating material adapted to be secured to the stationary element adjacent the commutator, a pair of metallic terminal members secured to said block in spaced, insulated relationship, each of said terminal members having a lip projecting from said block, a pair of brush supports each having means at one end thereof adapted to support a brush and an aperture at the other end to swivelly mount said brush supports on said projecting lips, said lips being respectively disposed on opposite sides of said commutator, whereby said brush supports are disposed on opposite sides of the commutator, and resilient means urging said brush supports toward each other, thereby urging the brushes into cooperative relation with the commutator.

4. In a dynamoelectric machine having a frame and a commutator, a block of electrically insulating material adapted to be secured to the frame adjacent the commutator, a pair of metallic terminal members secured to said block in spaced, insulated relationship, each of said terminal members having a lip projecting from said block and overlying said commutator, a pair of dipper shaped brush supports each having a cup portion adapted to support a brush therein and an apertured handle portion to swivelly mount said brush supports on said projecting lips, said lips being respectively disposed on opposite sides of said commutator whereby said brush supports are supported in depending relationship from said insulating block and lie on opposite sides of the commutator, and non-conducting resilient means connected between said brush supports to urge said supports toward each other, thereby urging the brushes into cooperative relation with the commutator.

5. In a dynamoelectric machine having a stationary element and a rotating commutator, a block of electrically insulating material adapted to be secured to said stationary element adjacent the commutator, a pair of metallic terminal members secured to said block in spaced, insulated relationship, each of said terminal members having a lip projecting from said block, a pair of brush supports each having means at one end thereof adapted to support a brush and an aperture at the other end to swivelly mount said brush supports on said projecting lips, said lips being respectively disposed on opposite sides of said commutator, whereby said brush supports are disposed on opposite sides of the commutator, resilient means urging said brush supports toward each other, thereby urging the brushes into cooperative relation with the commutator, a condenser integrally molded in said block, and means for electrically connecting said condenser across said brushes.

6. In a dynamoelectric machine having a frame and a commutator, a block of electrically insulating material adapted to be secured to the frame adjacent and overlying the commutator, a pair of metallic terminal members secured to said block in spaced, insulated relationship, each of said terminal members having a lip projecting from said block, a pair of brush supports each having means at one end thereof adapted to support a brush and an aperture at the other end to swivelly support said brush supports in depending relation on said projecting lips, said lips being respectively disposed on opposite sides of said commutator, whereby said brush supports are disposed on opposite sides of the commutator, resilient means urging said brush supports toward each other, thereby urging the brushes into cooperative relation with the commutator, a condenser integrally molded in said insulating block intermediate said metallic terminal members, and a pair of conductors disposed in said insulating block and electrically connecting said condenser across said terminal members.

7. In a dynamoelectric machine having a frame and a commutator, a block of electrically insulating material adapted to be secured to the frame adjacent and overlying the commutator, a pair of metallic terminal members secured to said block in spaced, insulated relationship, each of said terminal members having a lip projecting from said block, a pair of dipper shaped brush supports each having a cup portion at one end thereof and an aperture at the other end to swivelly mount said brush supports in depending relationship on said projecting lips, a pig tail brush secured to each of said brush portions, the pig tails of said brushes being respectively electrically connected to said terminal members, said lips being respectively disposed on opposite sides of said commutator, whereby said brushes are supported on opposite sides of the commutator, non-conducting resilient means connected between said brush supports to urge said supports toward each other, thereby urging the brushes into cooperative relation with the commutator, a condenser integrally molded in said block intermediate said terminal members, and a pair of conductors molded in said insulating block and electrically connecting said condenser across said terminal members.

8. In a dynamoelectric machine having a frame and a commutator rotatable therein, said frame having an aperture in the vicinity of said commutator, a block of electrically insulating material secured to said frame adjacent said aperture, a pair of metallic terminal members secured to said block in spaced, insulated relationship, each of said terminal members having portions thereof projecting through said frame aperture to facilitate electrical connections thereto, each of said terminal members also having a lip projecting axially inwardly with respect to said frame, a pair of brush supports each having means at one end thereof adapted to support a brush and an aperture at the other end to swivelly mount said brush supports on said projecting lips, said lips being respectively disposed on opposite sides of said commutator, whereby said brush supports are disposed on opposite sides of the commutator, resilient means urging said brush supports toward each other, thereby urging the brushes into cooperative relation with the commutator, a condenser integrally molded in said block, and means for electrically connecting said condenser across said brushes.

9. In a dynamoelectric machine having a fixed frame and a rotor rotatable therein, said frame having an aperture in the vicinity of said rotor, a block of electrically insulating material secured to said frame adjacent said aperture, a pair of metallic terminal members secured to said block in spaced, insulated relationship, each of said terminal members having portions thereof projecting outwardly with respect to said frame aperture to facilitate electrical connections thereto, each of said terminal members also having a portion projecting inwardly with respect to said frame and adapted to mount brush elements thereon, a condenser integrally molded in said block, and means for electrically connecting said condenser across said terminal members.

10. For use in a dynamoelectric machine of the commutator type, a block of electrically insulated material adapted to be mounted to a fixed portion of the machine adjacent the commutator, a pair of electrical terminals secured to said block in spaced relationship, each of said terminals having a portion thereof adapted to support a brush in cooperative relation with the commutator, a condenser integrally molded in said insulating block, and a pair of conductors disposed in said insulating block and electrically connecting said condenser directly across said electrical terminals.

JOSEPH NADER.

REFERENCES CITED

The following references are of record in the file of this patent:

UNITED STATES PATENTS

| Number | Name | Date |
| --- | --- | --- |
| 1,757,696 | Wood | May 6, 1930 |
| 2,008,377 | Whitaker | July 16, 1935 |
| 2,334,722 | Mirick | Nov. 23, 1943 |